US011660542B2

(12) United States Patent
Sim et al.

(10) Patent No.: US 11,660,542 B2
(45) Date of Patent: May 30, 2023

(54) FRAUD DETECTION IN ELECTRONIC SUBSCRIPTION PAYMENTS

(71) Applicant: Roblox Corporation, San Mateo, CA (US)

(72) Inventors: Richard Sim, San Mateo, CA (US); Dmitri Parks, Denver, CO (US); David Baszucki, Portola Valley, CA (US); Connor Kelley, San Mateo, CA (US); Hans Gunawan, San Mateo, CA (US); Matthew Kaufman, San Carlos, CA (US); Enrico D'Angelo, San Mateo, CA (US)

(73) Assignee: Roblox Corporation, San Mateo, CA (US)

(*) Notice: Subject to any disclaimer, the term of this patent is extended or adjusted under 35 U.S.C. 154(b) by 35 days.

(21) Appl. No.: 17/406,203

(22) Filed: Aug. 19, 2021

(65) Prior Publication Data

US 2021/0379494 A1 Dec. 9, 2021

Related U.S. Application Data

(63) Continuation of application No. 16/737,835, filed on Jan. 8, 2020, now Pat. No. 11,097,192.

(51) Int. Cl.
*A63F 13/75* (2014.01)
*A63F 13/792* (2014.01)

(52) U.S. Cl.
CPC ............ *A63F 13/75* (2014.09); *A63F 13/792* (2014.09)

(58) Field of Classification Search
CPC .............................. A63F 13/792; A63F 13/75
See application file for complete search history.

(56) References Cited

U.S. PATENT DOCUMENTS

| 5,970,143 | A | 10/1999 | Schneier et al. |
| 2003/0171145 | A1 | 9/2003 | Rowe |
| 2008/0077528 | A1 | 3/2008 | Neff |
| 2012/0030083 | A1 | 2/2012 | Newman et al. |
| 2012/0209770 | A1 | 8/2012 | Peruvemba et al. |
| 2013/0339228 | A1 | 12/2013 | Shuster et al. |

FOREIGN PATENT DOCUMENTS

| CN | 103635920 | 3/2014 |
| CN | 108479071 | 9/2018 |
| CN | 108830558 | 11/2018 |
| CN | 109045706 | 12/2018 |
| CN | 109284992 | 1/2019 |
| EP | 1344557 | 9/2003 |

(Continued)

OTHER PUBLICATIONS

USPTO, Notice of Allowance for U.S. Appl. No. 16/737,835, dated Apr. 29, 2021, 8 pages.

(Continued)

*Primary Examiner* — Reginald A Renwick
(74) *Attorney, Agent, or Firm* — IP Spring

(57) ABSTRACT

Methods, systems, and non-transitory computer-readable media are provided for fraud detection within an interactive media system such as a computer-based game. In some implementations, fraud in online subscription payments can be detected. The fraud detection can be used to adjust virtual currency revenue sharing payouts to developers associated with the computer-based game.

20 Claims, 6 Drawing Sheets

(56) References Cited

FOREIGN PATENT DOCUMENTS

| | | |
|---|---|---|
| GB | 201403687 | 4/2014 |
| JP | 4385863 | 12/2009 |
| KR | 200324885 | 8/2003 |

OTHER PUBLICATIONS

WIPO, International Search Report and Written Opinion for International Patent Application No. PCT/US2020/012804, dated Mar. 19, 2020, 7 pages.
IPO, First Examination Report for Indian Patent Application No. 202217023737, dated Sep. 2, 2022, 6 pages.
CNIPA, First Office Action (with English translation) for Chinese Patent Application No. 202080078673.2, dated Feb. 15, 2023, 20 pages.

FRAUD DETECTION IN ELECTRONIC SUBSCRIPTION PAYMENTS

CROSS-REFERENCE TO RELATED APPLICATIONS

The present application is a continuation of U.S. patent application Ser. No. 16/737,835, titled FRAUD DETECTION IN ELECTRONIC SUBSCRIPTION PAYMENTS and filed Jan. 8, 2020, the contents of which are hereby incorporated by reference in their entirety.

TECHNICAL FIELD

Embodiments relate generally to interactive media systems, and more particularly but not exclusively, to methods, systems and computer readable media for fraud detection in electronic subscription payments within interactive media systems.

BACKGROUND

Some interactive media systems, such as online gaming, provide an opportunity for users to purchase items within an online game or to purchase a subscription to a game platform. The game platform may provide user accounts to players to play online games and to developers to provide games on the game platform.

SUMMARY

Some implementations can include a computer-implemented method. The method can include accessing an electronic log associated with a user account on a game platform, wherein the electronic log includes a list of one or more games associated with a respective game developer and a duration of play for each of the one or more games during a first time period; determining a proportion of game play duration for a particular game of the one or more games during the first time period; calculating, for the particular game, an initial payout for the first time period based at least in part on the proportion of game play duration; aggregating the initial payout for the particular game into an aggregate payout over a second time period; receiving a fraud detection signal associated with the user account; adjusting the aggregate payout for the particular game having a fraud indication in the fraud detection signal, wherein the adjusting is performed after a third time period; and after the adjusting, transmitting an electronic payment to a developer account of the respective game developer of the one or more games, wherein the electronic payment is based on the aggregate payout.

In some implementations, the method further comprises aggregating the initial payout for additional games into an aggregate payout over the second time period based upon proportion of game play duration for the additional games.

In some implementations, the fraud detection signal is a payment fraud detection signal having an indication of whether a payment provider provides fraud visibility.

In some implementations, the fraud indication includes an indication of one or more of: payment fraud or game play fraud.

In some implementations, the adjusting the aggregate payout comprises adjusting over the third time period, wherein the third time period is longer than the first time period or the second time period.

In some implementations, the adjusting the aggregate payout is explicitly performed for payment chargebacks if a payment partner indicates an anticipated refund of a payment amount for a given user.

In some implementations, the method further comprises determining a subscription status of the user account based on the electronic log.

In some implementations, determining the subscription status of the user account comprises: accessing a database to retrieve a subscription record associated with the user account; and determining that an initiation time of the play for each of the one or more games during the first time period matches a subscription period in the subscription record.

In some implementations, the method further comprises providing exclusive subscriber content to the user account based on the subscription status, the exclusive subscriber content comprising one or more of: an exclusive game item, visible indication of subscription status, or subscriber-only game features.

In some implementations, the method further comprises: generating an earnings preview graph for each of the one or more games, wherein the earnings preview graph represents earnings accumulated by each respective game over the second time period; and causing the earnings preview graph to be displayed in a user interface on an electronic display of a game developer device associated with a developer of the respective game.

According to another aspect, a device to perform fraud detection in electronic payments is disclosed. The device comprises: one or more processors; and a memory coupled to the one or more processors, with instructions stored thereon that, when executed by the one or more processors to perform operations comprising: accessing an electronic log associated with a user account on a game platform, wherein the electronic log includes a list of one or more games associated with a respective game developer and a duration of play for each of the one or more games during a first time period; determining a proportion of game play duration for a particular game of the one or more games during the first time period; calculating, for the particular game, an initial payout for the first time period based at least in part on the proportion of game play duration; aggregating the initial payout for the particular game into an aggregate payout over a second time period; receiving a fraud detection signal associated with the user account; adjusting the aggregate payout for the particular game having a fraud indication in the fraud detection signal, wherein the adjusting is performed after a third time period; and after the adjusting, transmitting an electronic payment to a developer account of the respective game developer of the one or more games, wherein the electronic payment is based on the aggregate payout.

In some implementations, the operations further comprise aggregating the initial payout for additional games into an aggregate payout over the second time period based upon proportion of game play duration for the additional games.

In some implementations, the fraud detection signal is a payment fraud detection signal having an indication of whether a payment provider provides fraud visibility.

In some implementations, the fraud indication includes an indication of one or more of: payment fraud or game play fraud.

In some implementations, the adjusting the aggregate payout comprises adjusting over the third time period, wherein the third time period is longer than the first time period or the second time period.

In some implementations, the adjusting the aggregate payout is explicitly performed for payment chargebacks if a payment partner indicates an anticipated refund of a payment amount for a given user.

In some implementations, the operations further comprise determining a subscription status of the user account based on the electronic log.

In some implementations, determining the subscription status of the user account comprises: accessing a database to retrieve a subscription record associated with the user account; and determining that an initiation time of the play for each of the one or more games during the first time period matches a subscription period in the subscription record.

In some implementations, the operations further comprise providing exclusive subscriber content to the user account based on the subscription status, the exclusive subscriber content comprising one or more of: an exclusive game item, visible indication of subscription status, or subscriber-only game features.

According to another aspect, a non-transitory computer-readable medium is disclosed. The non-transitory computer-readable medium includes instructions stored thereon that, responsive to execution by a processing device, cause the processing device to perform operations comprising: accessing an electronic log associated with a user account on a game platform, wherein the electronic log includes a list of one or more games associated with a respective game developer and a duration of play for each of the one or more games during a first time period; determining a proportion of game play duration for a particular game of the one or more games during the first time period; calculating, for the particular game, an initial payout for the first time period based at least in part on the proportion of game play duration; aggregating the initial payout for the particular game into an aggregate payout over a second time period; receiving a fraud detection signal associated with the user account; adjusting the aggregate payout for the particular game having a fraud indication in the fraud detection signal, wherein the adjusting is performed after a third time period; and after the adjusting, transmitting an electronic payment to a developer account of the respective game developer of the one or more games, wherein the electronic payment is based on the aggregate payout.

DETAILED DESCRIPTION

Figure 1:
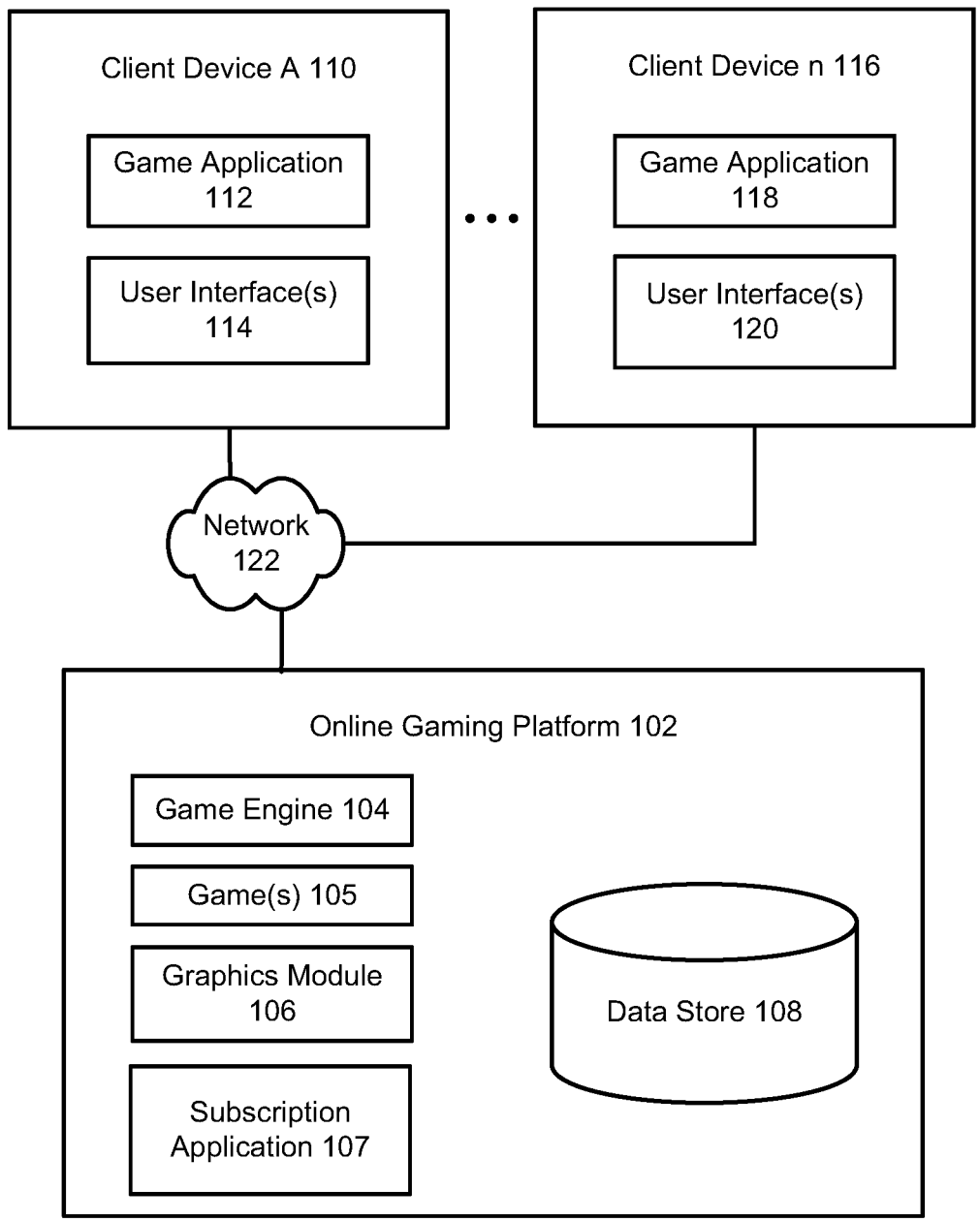
FIG. 1 is a diagram of an example system architecture for online gaming in accordance with some implementations.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

Interactive media applications or systems, such as online game platforms (which can include "user-generated content platforms" or "user-generated content systems"), can offer a variety of ways for users to interact with one another. For example, users of an online game platform may work together towards a common goal, share various virtual gaming items, send electronic messages to one another, and so forth. Users of an online game platform may play games using characters.

An online game platform may also allow users of the platform to create and animate new characters and avatars. For example, users of the online game platform may be allowed to create, design, and customize new characters.

FIG. 1: System Architecture

FIG. 1 illustrates an example system architecture 100, in accordance with some implementations of the disclosure. The system architecture 100 (also referred to as "system" herein) includes an online game platform 102, a first client device 110 (generally referred to as "client device(s) 110" herein), and at least one second client device 116, all coupled via a network 122. The online game platform 102 can include, among other things, a game engine 104, one or more games 105, a graphics module 106, a subscription application 107, and a data store 108. The client device 110 can include a game application 112 and user interfaces 114 (e.g., audio/video input/output devices). The client device 116 can include a game application 118 and user interfaces 120 (e.g., audio/video input/output devices). The audio/video input/output devices can include one or more of microphones, speakers, headphones, display device, etc.

System architecture 100 is provided for illustration, rather than limitation. In some implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online game platform 102 can include a server having one or more computing devices (e.g., a cloud computing system, a rackmount server, a server computer, cluster of physical servers, etc.). In some implementations, a server may be included in the online game platform 102, be an independent system, or be part of another system or platform.

In some implementations, the online game platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online game platform 102 and to provide a user with access to online game platform 102. The online game platform 102 may also include a website (e.g., a webpage) or application back-end software that may be used to provide a user with access to content provided by online game platform 102. For example, users may access online game platform 102 using the game application 112 on client devices 110.

In some implementations, online game platform 102 may include a type of social network providing connections between users or a type of user-generated content system that allows users (e.g., end-users or consumers) to communicate with other users on the online game platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online game platform 102 may be a virtual game platform. For example, the game platform may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to interaction of one or more players using client devices (e.g., 110 and/or 116) within a game (e.g., 105) or the presentation of the interaction on a display or other user interfaces (e.g., 114/120) of a client device 110 or 116.

In some implementations, a game 105 can include an electronic file that can be executed or loaded using software, firmware or hardware configured to present the game content (e.g., digital media item) to an entity. In some implementations, a game application 112 may be executed and a game 105 rendered in connection with a game engine 104. In some implementations, a game 105 may have a common set of rules or common goal, and the environments of a game 105 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game application 105 may be collectively referred to a "world" or "gaming world" or "virtual world" or "universe" herein. An example of a world may be a 3D world of a game 105. For example, a user may build a virtual environment that is linked to another virtual environment created by another user. A character of the virtual game may cross the virtual border to enter the adjacent virtual environment.

It may be noted that 3D environments or 3D worlds use graphics that provide a three-dimensional representation of geometric data representative of game content (or at least present game content to appear as 3D content whether or not 3D representation of geometric data is used). 2D environments or 2D worlds use graphics that provide two-dimensional representation of geometric data representative of game content.

In some implementations, the online game platform 102 can host one or more games 105 and can permit users to interact with the games 105 using a game application 112 of client devices 110. Users of the online game platform 102 may play, create, interact with, or build games 105, communicate with other users, and/or create and build objects (e.g., also referred to as "item(s)" or "game objects" or "virtual game item(s)" herein) of games 105. For example, in generating user-generated virtual items, users may create characters, animation for the characters, decoration for the characters, one or more virtual environments for an interactive game, or build structures used in a game 105, among others.

In some implementations, users may buy, sell, or trade game virtual game objects, such as in-platform currency (e.g., virtual currency), with other users of the online game platform 102. In some implementations, online game platform 102 may transmit game content to game applications (e.g., 112). In some implementations, game content (also referred to as "content" herein) may refer to any data or software instructions (e.g., game objects, game, user information, video, images, commands, media item, etc.) associated with online game platform 102 or game applications. In some implementations, game objects (e.g., also referred to as "item(s)" or "objects" or "virtual game item(s)" herein) may refer to objects that are used, created, shared or otherwise depicted in game applications 105 of the online game platform 102 or game applications 112 or 118 of the client devices 110/116. For example, game objects may include a part, model, character or components thereof (like faces, arms, lips, etc.), tools, weapons, clothing, buildings, vehicles, currency, flora, fauna, components of the aforementioned (e.g., windows of a building), and so forth.

It may be noted that the online game platform 102 hosting games 105, is provided for purposes of illustration, rather than limitation. In some implementations, online game platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, electronic comic books, software applications, etc. In some implementations, a media item may be an electronic file that can be executed or loaded using software, firmware or hardware configured to present the digital media item to an entity.

In some implementations, a game 105 may be associated with a particular user or a particular group of users (e.g., a private game), or made widely available to users of the online game platform 102 (e.g., a public game). In some implementations, where online game platform 102 associates one or more games 105 with a specific user or group of users, online game platform 102 may associate the specific user(s) with a game 102 using user account information (e.g., a user account identifier such as username and password).

In some implementations, online game platform 102 or client devices 110 may include a game engine 104 or game application 112/118. In some implementations, game engine 104 may be used for the development or execution of games 105. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, animation commands, physics commands, etc.) In some implementations, game applications 112/118 of client devices 110/116, respectively, may work independently, in collaboration with game engine 104 of online game platform 102, or a combination of both.

In some implementations, both the online game platform 102 and client devices 110/116 execute a game engine (104, 112, 118, respectively). The online game platform 102 using game engine 104 may perform some or all the game engine functions (e.g., generate physics commands, animation commands, rendering commands, etc.), or offload some or all the game engine functions to game engine 104 of client device 110. In some implementations, each game 105 may have a different ratio between the game engine functions that are performed on the online game platform 102 and the game engine functions that are performed on the client devices 110 and 116. For example, the game engine 104 of the online game platform 102 may be used to generate physics commands in cases where there is a collision between at least two game objects, while the additional game engine functionality (e.g., generate rendering commands) may be offloaded to the client device 110. In some implementations, the ratio of game engine functions performed on the online game platform 102 and client device 110 may be changed (e.g., dynamically) based on gameplay conditions. For example, if the number of users participating in gameplay of a particular game 105 exceeds a threshold number, the online game platform 102 may perform one or more game engine functions that were previously performed by the client devices 110 or 116.

For example, users may be playing a game 105 on client devices 110 and 116, and may send control instructions (e.g., user inputs, such as right, left, up, down, user election, or character position and velocity information, etc.) to the online game platform 102. Subsequent to receiving control instructions from the client devices 110 and 116, the online game platform 102 may send gameplay instructions (e.g., position and velocity information of the characters participating in the group gameplay or commands, such as rendering commands, collision commands, etc.) to the client devices 110 and 116 based on control instructions. For instance, the online game platform 102 may perform one or more logical operations (e.g., using game engine 104) on the control instructions to generate gameplay instruction for the client devices 110 and 116. In other instances, online game platform 102 may pass one or more or the control instructions from one client device 110 to other client devices (e.g., 116) participating in the game 105. The client devices 110 and 116 may use the gameplay instructions and render the gameplay for presentation on the displays of client devices 110 and 116.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online game platform 102. In other implementations, the control instructions may be sent from a client device 110 to another client device (e.g., 116), where the other client device generates gameplay instructions using the local game engine 104. The control instructions may include instructions to play a voice communication message or other sounds from another user on an audio device, e.g., speakers, headphones, etc.

In some implementations, gameplay instructions may refer to instructions that allow a client device 110 (or 116) to render gameplay of a game, such as a multiplayer game. The gameplay instructions may include one or more of user input (e.g., control instructions), character position and velocity information, or commands (e.g., physics commands, animation commands, rendering commands, collision commands, etc.).

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game 105. In some implementations, a character may include components such as body parts (e.g., hair, arms, legs, etc., which can be animated) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools. In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online game platform 102. In some implementations, creating, modifying, or customizing characters, other game objects, games 105, or game environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online game platform 102 may store characters created by users in the data store 108. In some implementations, the online game platform 102 maintains a character catalog and game catalog that may be presented to users via. In some implementations, the game catalog includes images of games stored on the online game platform 102. In addition, a user may select a character (e.g., a character created by the user or other user) from the character catalog to participate in the chosen game. The character catalog includes images of characters stored on the online game platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online game platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online game platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the game application 112 or 118, respectively. In one implementation, the game application 112 or 118 may permit users to use and interact with online game platform 102, such as control a virtual character in a virtual game hosted by online game platform 102, or view or upload content, such as games 105, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 or 116 and allows users to interact with online game platform 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online game platform application for users to build, create, edit, upload content to the online game platform 102 as well as interact with online game platform 102 (e.g., play games 105 hosted by online game platform 102). As such, the game application may be provided to the client device 110 or 116 by the online game platform 102. In another example, the game application may be an application that is downloaded from a server.

In some implementations, a user may login to online game platform 102 via the game application. The user may access a user account by providing user account information (e.g., username and password) where the user account is associated with one or more characters available to participate in one or more games 105 of online game platform 102.

In general, functions described in one implementation as being performed by the online game platform 102 can also be performed by the client device(s) 110 or 116, or a server, in other implementations if appropriate. In addition, the functionality attributed to a particular component can be performed by different or multiple components operating together. The online game platform 102 can also be accessed as a service provided to other systems or devices through appropriate application programming interfaces (APIs), and thus is not limited to use in websites.

The online game platform 102 includes a graphics module 106. In some implementations, the graphics module 106 may be a system, application, or module that permits the online game platform 102 to provide graphics and animation capability.

The online game platform 102 includes a subscription application 107. In some implementations, the subscription application 107 may perform one or more of the operations described below in connection with the flowcharts shown in FIG. 3 or 5.

Figure 2:
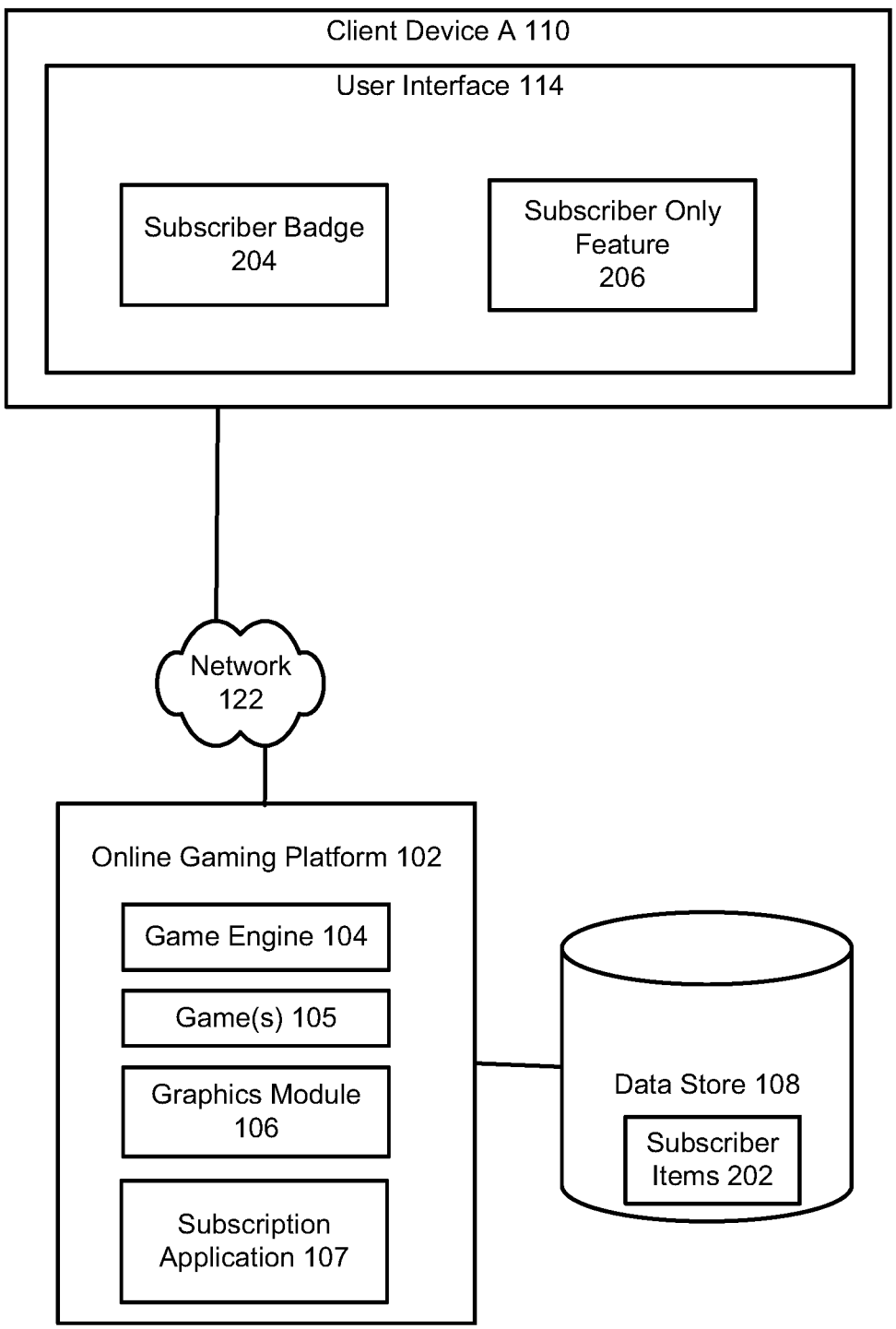
FIG. 2 is a diagram of an example system architecture for online gaming showing subscriber content features in accordance with some implementations.

FIG. 2: Interactive Media System with Subscriber Content

FIG. 2 is a diagram of the interactive media system of FIG. 1 showing details of subscriber content. For example, FIG. 2 shows details of subscriber-only content within the online game platform 102. In particular, the data store 108 includes subscriber items 202, which can include items that are available only to user accounts having an active subscription status. Subscriber items may include one or more of catalog items that are free to subscribers but cost money to non-subscribers, catalog items that are exclusively available for subscribers, or in game features that are exclusively available for subscribers including but not limited to one or more of areas of the game, vehicles, weapons or other items, capabilities such as the avatar showing up differently in-game such as trailing with streams as the user runs, or exclusive access to games (e.g. only premium subscribers can play these games).

For example, a user account may make a payment to online game platform 102, e.g., a recurring monthly payment, an annual payment, etc. to be registered as a subscribed of the platform. In some implementations, the subscription may be platform-wide, e.g., the subscription may enable users to access subscriber items 202 that are available to the user in any of games 105 provided by the platform. For example, such subscriber items may include, e.g., avatar types; clothing; weapons, accessories, and other items; icons or other indicators of subscriber status; etc. For example, in these implementations, each developer that provides a game 105 on the online game platform 102 may implement, via an application programming interface (API) provided by the online game platform 102, program code that enables users to access subscriber items. In some implementations, a subset of games 105 may recognize the active subscriber status, and provide access to subscriber-items. In some implementations, subscriber items 202 may include items related to in-game chat. For example, online gamine platform 102 may provide a chat feature that enables players within the game to engage in messaging conversations with each other. Subscriber-items for in-game chat may include chat avatars or icons, chat content items such as stickers, emojis, etc.

Further to the platform-wide items, a developer of one or more of games 105 may recognize the active subscriber status and provide game-specific items to the active subscriber when the subscriber plays the game. For example, if the game is to run a virtual pizza store, such items may include exclusive pizza ingredients, that are unavailable to non-subscribers that play the game. In another example, if the game is to fly a plane through a virtual environment, such items may include environments that are provided only to subscribers, plane types that are available only to subscribers, etc. Further, while the foregoing refers to subscribers and non-subscribers, in some implementations, multiple subscription tiers may be offered, with corresponding access to subscriber items 202.

Subscriptions may be made available by the online game platform 102 for various periods, e.g., daily, weekly, monthly, annual, etc. Users of the game platform 102 may purchase subscriptions by making a payment to the game platform 102 using a virtual currency of the game platform 102. For example, the game platform may implement a virtual currency that enables users to buy or sell items (e.g., clothing, accessories, weapons, etc.) and to buy subscriptions. Users may convert between the virtual currency of the game platform 102 and a real currency (e.g., US dollar or other currency) via the game platform 102. In some implementations, game developers may choose prices for individual game items that can be bought or sold, while the game platform 102 may be determine the price of a subscription, e.g., a platform-wide subscription (with one or more tiers). In some implementations, the game platform 102 may provide a portion of the subscription revenue to one or more game developers that are associated with respective games 105, e.g., using techniques described herein with reference to FIGS. 4 and 5.

In some implementations, the subscriber items may be limited to the user account to which they are awarded and may not be saleable or tradeable, while other items in the game (that are not subscriber items or are not enabled through the subscription) may remain saleable or tradable.

In some implementations, subscriber items 202 may be provided by the online game platform 102. In some implementations, subscriber items 202 may be provided by individual game developers associated with one of more of the games 105.

FIG. 2 also shows details of the user interface 114 displayed by client device 102. The subscriber user interface details include subscriber content such as a subscriber badge 204 and one or more subscriber only game features 206. The subscriber badge 204 can include a graphical indicium displayed in a user interface of the game platform that indicates the subscriber status of the user account. The subscriber badge 204 can be displayed in various places within the online game platform such as in chat interfaces, leaderboards, etc. The subscriber only game features 206 can include features that have been designated by a game developer (e.g., a third-party user generated content developer) to be available only to those users having a user account associated with an active subscription.

Figure 3:
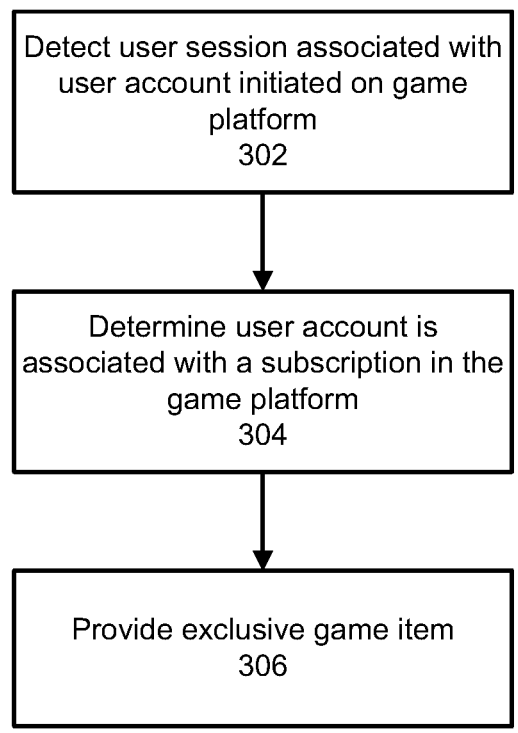
FIG. 3 is a flowchart of a method for providing subscriber content in accordance with some implementations.

FIG. 3: Method to Provide Subscriber Content

FIG. 3 is a flowchart of an example method 300 (e.g., a computer-implemented method) to provide subscriber only content to a client, in accordance with some implementations.

In some implementations, method 300 can be implemented, for example, on one or more of a server device or a client device, or other device or a combination of devices. In some implementations, some or all of method 300 can be implemented on one or more of devices 102 or 110/118 shown in FIG. 1, and/or on both server device(s) and client device(s). In described examples, the implementing system includes one or more digital hardware processors or processing circuitry ("processors"), and one or more storage devices. Method 300 may be performed by a subscription application (e.g., 107) executing on a server or platform system (e.g., 102). In some implementations, different components of one or more devices or facilities can perform different blocks or other parts of the method 300.

In some implementations, the method 300, or portions of the method, can be initiated automatically by a device. For example, the method (or portions thereof) can be periodically performed or performed based on the occurrence of one or more particular events or conditions. For example, such events or conditions can include a client device associated with a subscriber account executing a videogame, a predetermined time period having expired since the last performance of method 300, and/or one or more other events or conditions occurring which can be specified in settings of a device implementing method 300. In some implementations, such conditions can be previously specified by a user in stored custom preferences of the user (accessible by a device or method with user consent). In some examples, a device (server or client) can perform the method 300 with access to one or more applications. In another example, a server device can send data to a client over a network, and the client can perform method 300 in whole or in part. Method 300 can also be performed using a combination of processing on a server device, one or more client devices, and/or a combination of the above.

Processing begins at 302, where initiation of a user session associated with a user account on a game platform is detected. For example, the user session can include a user session for a particular game hosted on the game platform. Initiation of the user session can include a user logging into the game platform and initiating game play in the particular game. Processing continues to 304.

At 304, the user account is determined to be associated with a subscription of the game platform. For example, if the user account includes a subscription of the game platform, a record associated with the user account can include an indication that the user account is associated with a subscription. When a user starts a new subscription, a record associated with the user's account can be updated to reflect the new subscription. When a subscription ends or is terminated, a record associated with the user account can be updated to reflect the termination or expiration of the subscription. In some implementations, determining that the user account is associated with the subscription can include accessing a database to retrieve a subscription record associated with the user account, and determining that an initiation time of the user session matches a subscription period in the subscription record. Processing continues to 306.

At 306, exclusive subscriber content can be provider to the user account based on an active subscription status. For example, an exclusive game item (e.g., one or more of subscriber items 202) of the particular game can be provided in the user session. In another example, a user account can be provided with an indication visible in the game platform user interface to indicate subscriber status (e.g., subscriber badge 204). In yet another example, one or more subscriber-only game features (e.g., 206) can be enabled based on the subscription status of the user account.

In some implementations, the user session can be associated with an avatar, and the exclusive game item can include a particular avatar, or an item worn by the avatar. In some implementations, the exclusive game item can be selected from a set of exclusive game items for the particular game, and the exclusive game item can be usable within gameplay of the particular game. In some implementations, the set of exclusive items can include a subset of game items for the particular game that are associated with a subscription item indicator, and at least one of the set of exclusive items are unavailable to user accounts that are not associated with the subscription of the game platform.

In some implementations, the game platform can include a chat feature with a chat user interface. In some implementations, a subset of games 105 may recognize the active subscriber status and provide access to subscriber-items. In some implementations, subscriber-items may include items related to in-game chat. For example, online gamine platform 102 may provide a chat feature that enables players within the game to engage in messaging conversations with each other. Subscriber-items for in-game chat may include chat avatars or icons, chat content items such as stickers, emojis, etc.

The method can also include, in response to determining that the user account is associated with the subscription, providing a visual appearance for the user account that indicates that the user account is associated with the subscription. In some implementations, the subscription can include a game-specific subscription for the particular game, and the exclusive game item is unavailable to other user accounts that are not associated with the game-specific subscription.

In some implementations, the subscription can include a platform-wide subscription for the game platform, and the exclusive game item is unavailable to other user accounts that are not associated with the platform-wide subscription.

Figure 4:
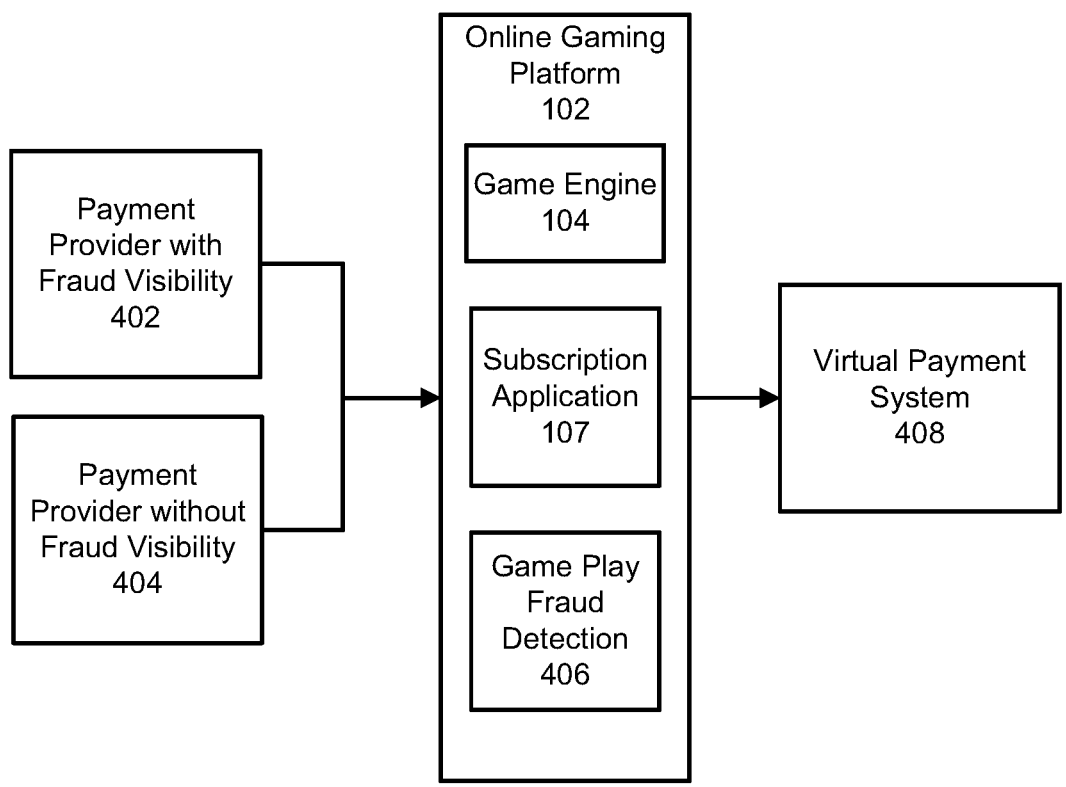
FIG. 4 is a diagram showing a fraud detection environment in accordance with some implementations.

FIG. 4: System to Share Electronic Subscription Payments

FIG. 4 is a diagram showing online game platform 102 and associated systems and components to share electronic subscription payments with game developers. Within the online game platform 102, the game engine 104 can maintain a log of games played, user accounts playing the games, and/or proportion of time each user spent on each game. The game engine can also include a game play fraud detection application 406, which can detect fraudulent game play (e.g., use of software bots to automate gameplay, exploitation of software bugs, use of cheat codes, or the like) and provide a fraud signal to the subscription application. The fraud signal can include an indication of the presence or absence of fraudulent game play by one or more user accounts in one or more games.

The subscription application 107 can also receive subscription payment information from one or more payment providers with fraud visibility 402 and from one or more payment providers without fraud visibility information 404. The information from 402 and 404 can be included in the fraud signal received by the subscription application 107.

The subscription application 107 can use the fraud signal information to detect fraud and adjust any payouts (e.g., share of subscription revenue with third-party game developers) based on the detected fraud. Once adjusted for fraud, subscription revenue sharing payouts can be sent or transmitted electronically to a payment system such as a virtual payment system 408. Further details of fraud detection and electronic subscription payment revenue sharing payout adjustment are described below in connection with FIG. 5.

Figure 5:
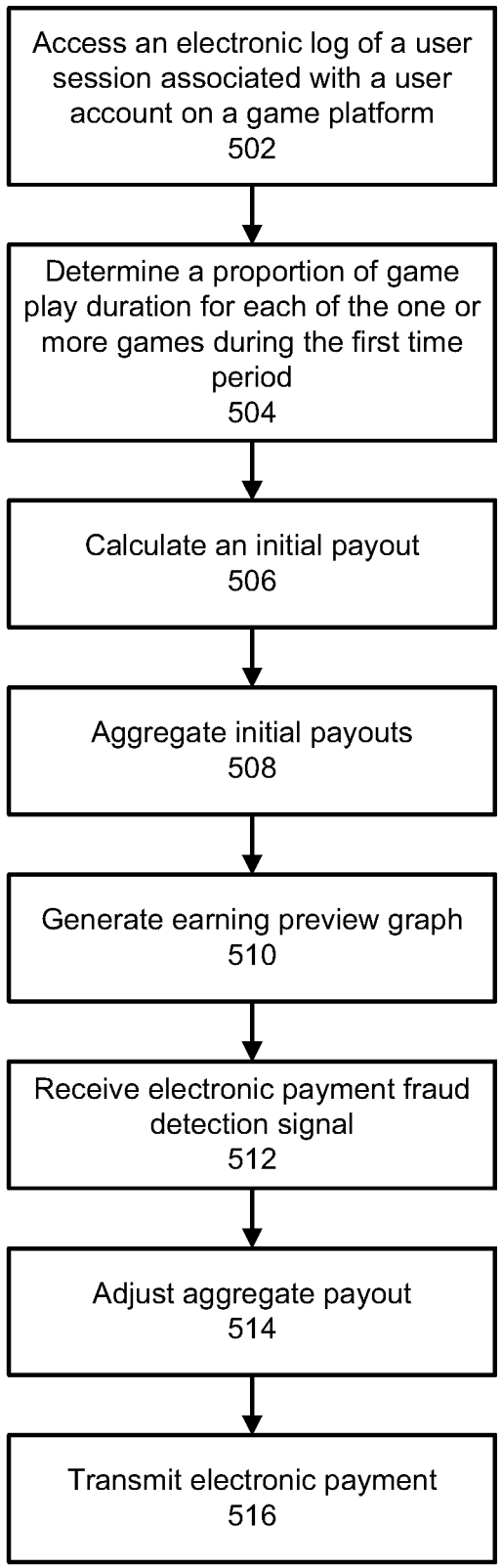
FIG. 5 is a flowchart of an example method for fraud detection in electronic subscription payments in accordance with some implementations.

FIG. 5: Example Method to Detect Fraud and Adjust Payments

FIG. 5 is a flowchart of an example method 500 (e.g., a computer-implemented method) to perform fraud detection and adjustment of electronic subscription payments, in accordance with some implementations.

In some implementations, method 500 can be implemented, for example, on one or more of a server device or a client device, or other device or a combination of devices. In some implementations, some or all of method 500 can be implemented on one or more of devices 102 or 110/118 shown in FIG. 1, and/or on both server device(s) and client device(s). In described examples, the implementing system includes one or more digital hardware processors or processing circuitry ("processors"), and one or more storage devices. Method 500 may be performed by a subscription application (e.g., 107) executing on a server or platform system (e.g., 102). In some implementations, different components of one or more devices or facilities can perform different blocks or other parts of the method 500.

In some implementations, the method 500, or portions of the method, can be initiated automatically by a device. For example, the method (or portions thereof) can be periodically performed or performed based on the occurrence of one or more particular events or conditions. For example, such events or conditions can include a client device associated with a subscriber account executing a videogame, a predetermined time period having expired since the last performance of method 500, and/or one or more other events or conditions occurring which can be specified in settings of a device implementing method 500. In some implementations, such conditions can be previously specified by a user in stored custom preferences of the user (accessible by a device or method with user consent). In some examples, a device (server or client) can perform the method 500 with access to one or more applications. In another example, a server device can send data to a client over a network, and the client can perform method 500 in whole or in part. Method 500 can also be performed using a combination of processing on a server device, one or more client devices, and/or a combination of the above.

Processing begins at 502, where an electronic log of a user session associated with a user account on a game platform is accessed. For example, the accessing can include accessing an electronic log of a user session associated with a user account on a game platform, where the user session is for one or more games hosted on the game platform, and where the electronic log includes a list of the one or more games and a duration of play for each of the one or more games during a first time period. In some implementations, the first time period can include a time period of 24 hours, e.g., corresponding to a calendar day. In some implementations, the accessing includes accessing a log for the user session of the user account that is a subscriber account in the game platform. Processing continues to 504.

At 504, a proportion of game play duration for each of the one or more games during the first time period is determined. For example, if a given user account plays four games over four hours during the first time period (e.g., 24 hours), the proportion of the four hours corresponding to each of the four games is determined. In some implementations, a minimum threshold duration of gameplay, e.g., 5 minutes, 10 minutes, per game is utilized to determine the proportion. For example, a game that is played for less than the minimum threshold duration may be treated as not being played (duration of zero) when determining the proportion. In some implementations, the proportion may be a simple proportion, e.g., if each game is played for 1 hour, the proportion is 25% for each game; if a first game is played for 2 hours, a second game is played for 1 hour, and a third and fourth game are played for half an hour each, the proportion may be 50%, 25%, 12.5%, and 12.5% respectively for the first, second, third, and fourth games. In some implementations, a floor and/or a cap per period may be utilized when determining proportion. For example, if a game is below a floor, e.g., 5% of time, the game may be excluded from the calculation when determining proportion. In another example, if a game is >6 hours, e.g., 25% of total time in a 24-hour period, the cap of 25% may be applied. Processing continues to 506.

At 506, an initial payout for the first time period is calculated. For example, the calculating can include calculating an initial payout, for each of the one or more games, based at least in part on the proportion of game play duration for respective games. In some implementations, calculating the initial payout includes multiplying a gross revenue amount by one or more of a first factor, a second factor, and a third factor, where the first factor is a proportion of game play for the first time period, the second factor is a commission factor, and the third factor is a holdback percentage. The gross revenue amount may be the subscription revenue allocated to the first time period. For example, if the subscription revenue is 30 units of a virtual currency for a 30-day subscription, each 24-hour period (day) may be allocated a gross revenue amount of 1 unit of virtual currency. In another example, subscription revenue can be the same per user based on the subscription package they are using (e.g., $5, $10, or $20 per month). A proportion of that subscriber's value can be determined and apply it to payouts. For example, if a user plays 1 hour across a 28-day period, 30 mins in game A and 30 mins in game B, those two games (or the developers of those two games) will each get 50% of the payout. Processing continues to 508.

At 508, the initial payouts for each of the one or more games are aggregated into an aggregate payout over a second time period. The second time period can be greater than the first time period. For example, the second time period can include a time period of 30 days. In some implementations, the aggregate payout for each of the one or more games from a plurality of user accounts of the game platform can be aggregated. Processing continues to 510.

At 510, an earnings preview graph (or other user interface) is optionally generated. For example, the earnings preview graph can represent earnings accumulated by a respective game over the second time period. The earnings preview graph can be caused to be displayed in a user interface on an electronic display of a game developer device associated with a developer of the respective game. For example, the earnings preview graph may illustrate (on a per-game basis or across a plurality of games provided by the game developer on the game platform) the total earnings of the game developer from subscribing users of the game platform, as a graph that with time (e.g., days of the month) on the X-axis and earnings (e.g., in virtual currency or in a real currency) on the Y-axis. In some implementations, the earnings preview graph may indicate estimated future earnings, e.g., based on past earnings from the developer's games, based on overall gameplay patterns on the game platform, based on a change in the number of subscribing users (e.g., from a previous month or other time period) of the game platform, etc. For example, if the game platform subscribers double from a past time period to a current time period and spend similar amounts of time in a game from the game developer, the earnings forecast may be shown as double that of the previous month. Processing continues to 512.

At 512, a fraud detection signal is received. The fraud detection signal can include a payment fraud detection signal having an indication of whether a payment provider provides fraud visibility. The payment fraud detection signal can be used to adjust electronic subscription revenue sharing payment amounts. Payments from a payment provider with fraud visibility may be considered more trustworthy (or at least more verifiable) and be subject to less adjustment. Payments from providers that do not supply fraud visibility may be considered less trustworthy and may be subject to more adjustment or reduction than payment from providers that supply fraud visibility information. Some payment providers do not provide fraud visibility. In some implementations, payments form providers that do not include fraud visibility may not be included in payouts to developers. In some implementations, a model can project the time and payouts for users even if no fraud visibility is provided from the payment provider.

The fraud detection signal can also include an indication of game play fraud. In some implementations, the system may determine that a user is in fact a bot that is programmed to play a particular game. The payouts system can be arranged in a way that makes this type of botting economically infeasible. The game play fraud signal can be used to adjust the proportion of game play duration. For example, for any time periods in which game play fraud was determined to be present based on the game play fraud detection signal, those time periods may be deducted from a total game play duration for a given game prior to computation of proportions. The adjustment based on the indication of game play fraud can, in turn, cause a change in an electronic subscription revenue sharing payment.

In some implementations, fraud detection for each game is performed based on analyzing gameplay by the user account in the game and comparing the gameplay with a baseline. In some implementations, gameplay activity can be clustered (e.g., into genuine activity clusters and fraudulent activity clusters) and the system can determined whether the gameplay activity is within a threshold distance from a genuine activity cluster. In some implementations, fraudulent activity can be determined and distinguished from genuine activity by analyzing per user game engagement distribution and programmatically looking for outliers. The system could also be configured to programmatically search for repetitive actions or signs that the engagement is programmatic (e.g., moves every 5 seconds). Processing continues to 514.

At 514, the aggregate payout for each of the one or more games having a fraud indication in the fraud detection signal is adjusted. For example, the adjusting can be performed after a third time period. The third time period can be longer than the first or second time periods. In some implementations, payouts are in a virtual currency (e.g., robux). Adjustments can be made explicitly for chargebacks when a payment partner indicates that they will in fact refund the payment amount for a given user. As a result, for that user, the system may calculate a 0 payout because the system operator was not paid for that have not been paid for that user's subscription. In some implementations, the third time period can be about 56 days. Processing continues to 516.

At 516, an electronic payment is transmitted to a developer account corresponding to each of the one or more games, and where the electronic payment is based on the adjusted aggregate payout for each respective game of the one or more games. In some implementations, the electronic payment can include a virtual currency payment. For example, the payment may be transferred at certain times, e.g., 25 days after the first time period (e.g., a month) has ended. In some implementations, payment can be made in a virtual currency (e.g., robux). In other implementations, payouts could be made in real world fiat currency. In some implementations, payment may also happen on a daily basis, or even continuously. There will typically be a lag that permits the system to accommodate for charged back purchases.

Figure 6:
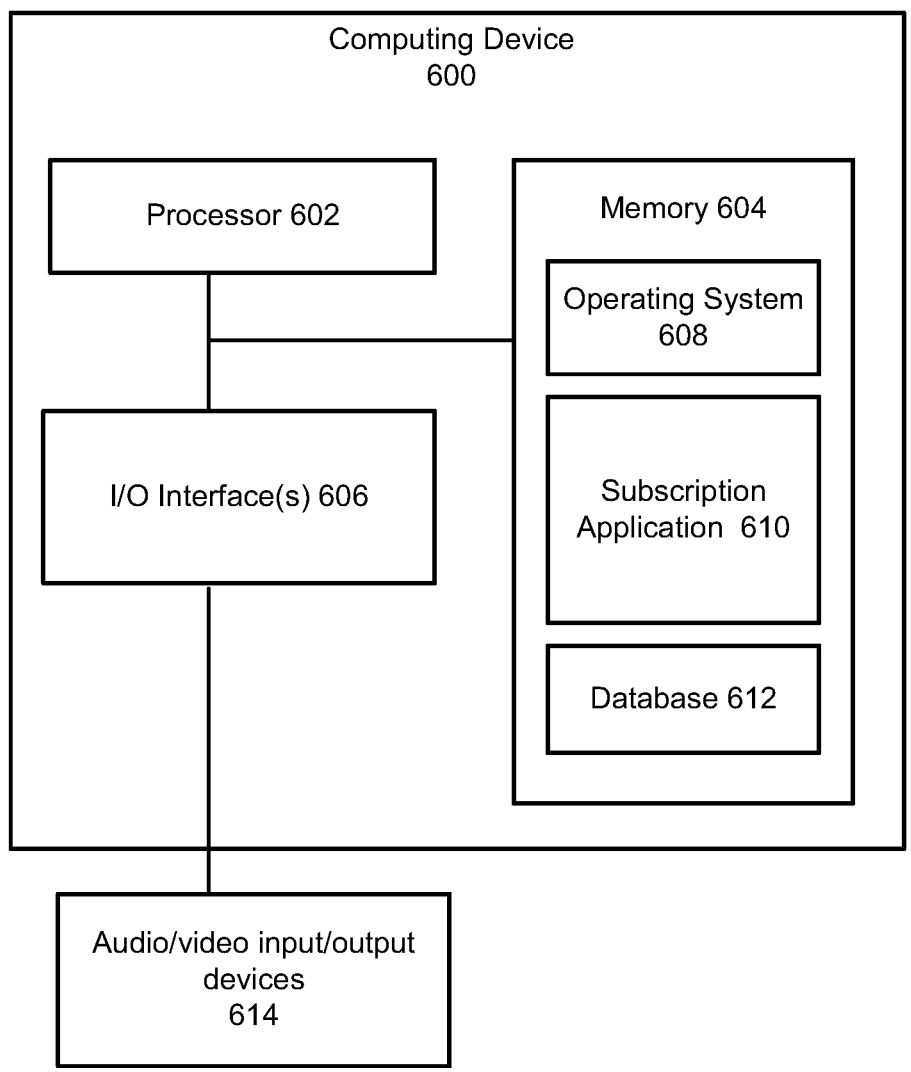
FIG. 6 is a block diagram illustrating an example computing device in accordance with some implementations.

FIG. 6: Example Computing Device

FIG. 6 is a block diagram of an example computing device 600 which may be used to implement one or more features described herein. The client devices 110 and 118 and/or the game platform 102 of FIG. 1 may be provided in the form of the computing device 600 of FIG. 6. In one example, device 600 may be used to implement a computer device, (e.g., 102, 110, and/or 118 of FIG. 1), and to perform appropriate method implementations described herein. Computing device 600 can be any suitable computer system, server, or other electronic or hardware device. For example, the computing device 600 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 600 includes a processor 602, a memory 606, input/output (I/O) interface 606, and audio/video input/output devices 614.

Processor 602 can be one or more processors and/or processing circuits to execute program code and control basic operations of the device 600. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, one or more applications 610, e.g., a subscription application, and application data 612. In some implementations, application 610 can include instructions that enable processor 602 to perform the functions described herein, e.g., some or all of the methods of FIG. 3 or 5, or one of the example implementations described above.

Any of software in memory 604 can alternatively be stored on any other suitable storage location or computer-readable medium. In addition, memory 604 (and/or other connected storage device(s)) can store instructions and data used in the features described herein. Memory 904 and any other type of storage (magnetic disk, optical disk, magnetic tape, or other tangible media) can be considered "storage" or "storage devices."

I/O interface 606 can provide functions to enable interfacing the server device 600 with other systems and devices. For example, network communication devices, storage devices (e.g., memory and/or data store 108), and input/output devices can communicate via interface 606. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 614 can include an audio input device (e.g., a microphone, etc.) that can be used to receive audio messages as input, an audio output device (e.g., speakers, headphones, etc.) and/or a display device, that can be used to provide graphical and visual output such as the user interface of FIG. 2.

For ease of illustration, FIG. 6 shows one block for each of processor 602, memory 604, I/O interface 606, and software blocks 608 and 610. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While the online game platform 102 is described as performing operations as described in some implementations herein, any suitable component or combination of components of online game platform 102 or similar system, or any suitable processor or processors associated with such a system, may perform the operations described.

A user (or client) device can also implement and/or be used with features described herein. Example user devices can be computer devices including some similar components as the device 600, e.g., processor(s) 602, memory 604, and I/O interface 606. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 614, for example, can be connected to (or included in) the device 600 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., one or more steps of methods 300 or 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   accessing an electronic log associated with a user account on a game platform, wherein the electronic log includes a list of one or more games associated with a respective game developer and a duration of play for each of the one or more games during a first time period;
   determining a proportion of game play duration for a particular game of the one or more games during the first time period;
   calculating, for the particular game, an initial payout for the first time period based at least in part on the proportion of game play duration;
   aggregating the initial payout for the particular game into an aggregate payout over a second time period;
   receiving a fraud detection signal associated with the user account;
   adjusting the aggregate payout for the particular game having a fraud indication in the fraud detection signal, wherein the adjusting is performed after a third time period; and
   after the adjusting, transmitting an electronic payment to a developer account of the respective game developer of the one or more games, wherein the electronic payment is based on the aggregate payout.

2. The computer-implemented method of claim 1, further comprising aggregating the initial payout for additional games into an aggregate payout over the second time period based upon proportion of game play duration for the additional games.

3. The computer-implemented method of claim 1, wherein the fraud detection signal is a payment fraud detection signal having an indication of whether a payment provider provides fraud visibility.

4. The computer-implemented method of claim 1, wherein the fraud indication includes an indication of one or more of: payment fraud or game play fraud.

5. The computer-implemented method of claim 1, wherein the adjusting the aggregate payout comprises adjusting over the third time period, wherein the third time period is longer than the first time period or the second time period.

6. The computer-implemented method of claim 1, wherein the adjusting the aggregate payout is explicitly performed for payment chargebacks if a payment partner indicates an anticipated refund of a payment amount for a given user.

7. The computer-implemented method of claim 1, further comprising determining a subscription status of the user account based on the electronic log.

8. The computer-implemented method of claim 7, wherein determining the subscription status of the user account comprises:
   accessing a database to retrieve a subscription record associated with the user account; and
   determining that an initiation time of the play for each of the one or more games during the first time period matches a subscription period in the subscription record.

9. The computer-implemented method of claim 7, further comprising providing exclusive subscriber content to the user account based on the subscription status, the exclusive subscriber content comprising one or more of: an exclusive game item, visible indication of subscription status, or subscriber-only game features.

10. The computer-implemented method of claim 1, further comprising:
generating an earnings preview graph for each of the one or more games, wherein the earnings preview graph represents earnings accumulated by each respective game over the second time period; and
causing the earnings preview graph to be displayed in a user interface on an electronic display of a game developer device associated with a developer of the respective game.

11. A device to perform fraud detection in electronic payments, the device comprising:
one or more processors; and
a memory coupled to the one or more processors, with instructions stored thereon that, when executed by the one or more processors to perform operations comprising:
accessing an electronic log associated with a user account on a game platform, wherein the electronic log includes a list of one or more games associated with a respective game developer and a duration of play for each of the one or more games during a first time period;
determining a proportion of game play duration for a particular game of the one or more games during the first time period;
calculating, for the particular game, an initial payout for the first time period based at least in part on the proportion of game play duration;
aggregating the initial payout for the particular game into an aggregate payout over a second time period;
receiving a fraud detection signal associated with the user account;
adjusting the aggregate payout for the particular game having a fraud indication in the fraud detection signal, wherein the adjusting is performed after a third time period; and
after the adjusting, transmitting an electronic payment to a developer account of the respective game developer of the one or more games, wherein the electronic payment is based on the aggregate payout.

12. The device of claim 11, wherein the operations further comprise aggregating the initial payout for additional games into an aggregate payout over the second time period based upon proportion of game play duration for the additional games.

13. The device of claim 11, wherein the fraud detection signal is a payment fraud detection signal having an indication of whether a payment provider provides fraud visibility.

14. The device of claim 11, wherein the fraud indication includes an indication of one or more of: payment fraud or game play fraud.

15. The device of claim 11, wherein the adjusting the aggregate payout comprises adjusting over the third time period, wherein the third time period is longer than the first time period or the second time period.

16. The device of claim 11, wherein the adjusting the aggregate payout is explicitly performed for payment chargebacks if a payment partner indicates an anticipated refund of a payment amount for a given user.

17. The device of claim 11, wherein the operations further comprise determining a subscription status of the user account based on the electronic log.

18. The device of claim 17, wherein determining the subscription status of the user account comprises:
accessing a database to retrieve a subscription record associated with the user account; and
determining that an initiation time of the play for each of the one or more games during the first time period matches a subscription period in the subscription record.

19. The device of claim 17, wherein the operations further comprise providing exclusive subscriber content to the user account based on the subscription status, the exclusive subscriber content comprising one or more of: an exclusive game item, visible indication of subscription status, or subscriber-only game features.

20. A non-transitory computer-readable medium with instructions stored thereon that, responsive to execution by a processing device, cause the processing device to perform operations comprising:
accessing an electronic log associated with a user account on a game platform, wherein the electronic log includes a list of one or more games associated with a respective game developer and a duration of play for each of the one or more games during a first time period;
determining a proportion of game play duration for a particular game of the one or more games during the first time period;
calculating, for the particular game, an initial payout for the first time period based at least in part on the proportion of game play duration;
aggregating the initial payout for the particular game into an aggregate payout over a second time period;
receiving a fraud detection signal associated with the user account;
adjusting the aggregate payout for the particular game having a fraud indication in the fraud detection signal, wherein the adjusting is performed after a third time period; and
after the adjusting, transmitting an electronic payment to a developer account of the respective game developer of the one or more games, wherein the electronic payment is based on the aggregate payout.

* * * * *